INVENTOR.
JOSEPH R. BURNS
BY John V. Regan
Attorney

United States Patent Office 3,388,292
Patented June 11, 1968

3,388,292

INSULATED GATE FIELD-EFFECT TRANSISTOR MEANS FOR INFORMATION GATING AND DRIVING OF SOLID STATE DISPLAY PANELS

Joseph R. Burns, Trenton, N.J., assignor to Radio Corporation of America, a corporation of Delaware
Filed Feb. 15, 1966, Ser. No. 527,563
3 Claims. (Cl. 315—169)

ABSTRACT OF THE DISCLOSURE

A scanned array of light cells including field-effect transistor selection and holding circuits are described. Each light cell in the array includes an output field-effect transistor having its conduction path connected in series with a light emissive element. At least one selection field-effect transistor has its conduction path connected between an image signal source and the gate of the output transistor. A scan generator periodically turns the selection transistor on and off, whereby the image signal is stored on the gate capacitance of the output transistor during the off time so that the output transistor continues to conduct a steady current during the off time.

Figures 1, 2:
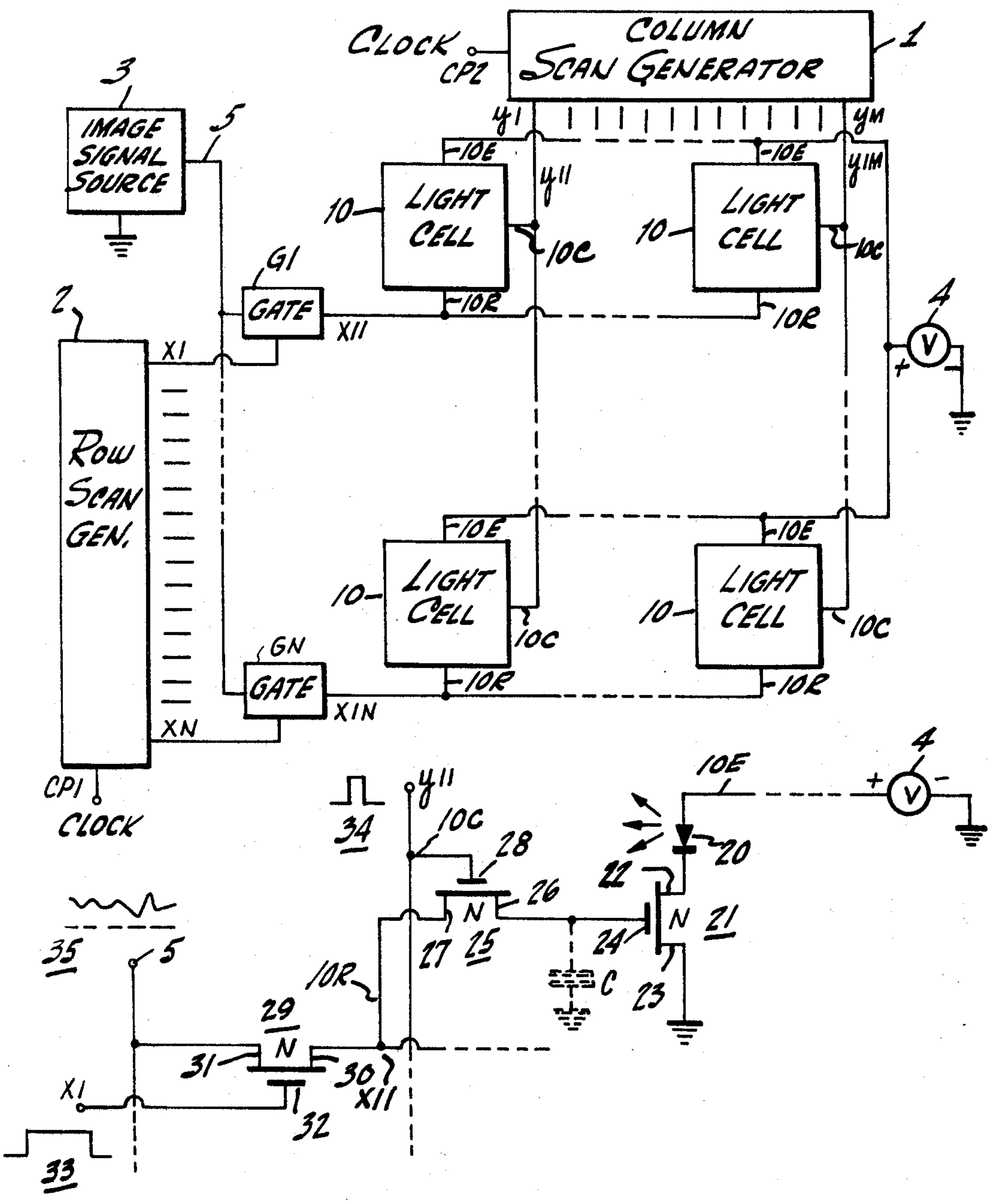

This invention relates to display panels, and more particularly to a novel insulated gate field-effect transistor circuit arrangement for selecting the light emissive elements of a solid state display panel.

In the usual type solid state display panel, the image signal is selectively applied in sequence to the light elements under the control of scan generator means operating in a cyclic mode. The image signal applied to a selected light element must be held or stored until the light element is again selected during the succeeding cycle. The present invention is specifically concerned with a selection and holding circuit arrangement for an array of light emissive elements.

Accordingly, an object of this invention is to provide a novel selection and holding circuit arrangement for a plurality of light emissive elements.

It is another object of this invention to provide a novel insulated gate field-effect transistor selection and holding circuit arrangement for a display panel.

In accomplishing the foregoing objects, the present invention is embodied as an array of light cells, each cell including at least a column and an output insulated gate field-effect transistor. When the array is a coordinate one having rows and columns of cells, a further insulated gate field-effect transistor is provided for each row. In each cell the light element is connected in series with the conduction path of the output transistor. The column transistor has its conduction path coupled between the gate electrode of the output transistor and an image signal source by way of the conduction path of the associated row transistor. Column and row scan generators selectively gate the image signal to the gate electrode of the output transistor of each cell by way of the conduction paths of the selected column and row transistors.

In the drawings:

FIG. 1 is a blocked diagram of a control system for scanning the light cells of a displayed panel; and FIG. 2 is a circuit diagram of a light cell embodying the novel circuit arrangement of the present invention.

In FIG. 1 a plurality of light cells 10 are arranged in rows and columns to form a matrix array display panel capable of displaying static or dynamic images. For sake of convenience, only the first and last light cells of the rows and columns are illustrated. Each of the light cells 10 includes a light emissive element and circuitry for performing a holding or storing function which will hereinafter be described in detail in connection with FIG. 2. Column conductors Y11 and Y1M are connected to the column connection 10C of each light cell in the corresponding columns. Row conductors X11 and X1M are similarly connected to the row connection 10R of each light cell in the corresponding rows. The dashed portions of the row and column conductors illustrate that further light cells may be connected in the rows and columns of the array. A source of energizing potential 4 has one of its terminals connected to the supply connection 10E of each light cell in the array. The other terminal of the energizing source 4 is connected to a point of reference potential, illustrated in FIG. 1 by the conventional symbol for circuit ground.

The column conductors Y11 and Y1N are further connected to the output conductors Y1 and YM of a column scan generator. The row conductors X11 and X1M are further connected to the output terminals of gates G1 and GN associated with each row. The input terminals of each of the gates G1 and GN are connected in common to the output terminal 5 of an image signal source 3, the other terminal of which is connected to circuit ground. The control terminals of the gates G1 and GN are connected to the output conductors X1 and XN of a row scan generator 2.

The image signal source 3 is capable of developing at its output terminal 5 an image signal waveform indicative of the image to be displayed. As such, the image signal source 3 may represent a television system, a data processing system, or the like.

The column and row scan generators, for example, may be conventional ring counters capable of sequentially developing a digital control signal at their outputs during each cycle of operation. Both the row and column scan generators operate under the control of a clock system as illustrated by the terminals CP1 and CP2 associated with the row and column generators, respectively. The clock system may be conventional type.

In operation the row scan generator 2 sequentially enables the gates G1 and GN to pass the image signal to the row conductors X11 and X1N. The duration of the digital control pulses developed by the row scan generator is such that the selected gate remains enabled for a time period which is sufficient to permit the column scan generator to sequentially apply digital column control pulses to each of the light cells in the corresponding selected row. For example, when the row X11 is selected, the row scan generator 2 applies a digital row control pulse to the control terminal of the gate G1, thereby enabling gate G1 to pass the image signal waveform to the light cells in the top row of the illustrated array. While the gate G1 is enabled, the column scan generator 1 applies a digital column control signal to the light cells 10 in the left hand column of the illustrated array. Since only the gate G1 is enabled at this time, only the uppermost light cell of the left hand column is selected. The light emissive element of the selected light cell responds to the image signal waveform with a light intensity proportional to the amplitude of the image waveform at this time. When the digital column control pulse on the column conductor Y11 terminates, the column scan generator sequentially applies similar digital column control pulses to the remaining column conductors. When the digital column control pulse applied to the last column of light cells terminates, the digtal row control pulse applied to the gate G1 also terminates. The row and column scan generators then sequentially scan the remaining rows of light cells in the array. After the last or bottom row of light cells is scanned, the first or top row is scanned again, and so on.

During the non-selected time of the light cell, the information received during the selection time must be retained until the light cell is again selected during the next cycle. A novel circuit arrangement for performing this retention function is embodied in FIG. 2. For sake of convenience, only the circuit arrangement of the light cell 10 defined by the column conductors Y11 and row conductor X11 is illustrated in FIG. 2.

The light cell circuit arangement embodied in FIG. 2 includes an electrically responsive light emissive element, illustrated as a luminescent diode 20 which may be of the GaAs type. The diode 20 has its anode connected by way of the cell supply connection 10E to the positive terminal of the energizing source 4, the negative terminal at which is grounded. Since the illustrated light element 20 is a diode device, the energizing source may be a DC source having a value of V volts. The cathode of the light element 20 is connected to one of the source and drain electrodes 22, for example, electrode of an N-type field-effect transistor 21. The other of the source and drain electrodes 23 is connected to circuit ground.

The field-effect transistor 21 has gate electrode 24 connected to one of the source and drain electrodes 26, for example, electrode of a column N-type field-effect transistor 25. The other of the source and drain electrodes 27 is connected by way of cell row connection 10R to row conductor X11. The gate electrode 28 of the column transistor 25 is connected by way of the cell column connection 10C to the column conductor Y11.

The row conductor X11 is further connected to one of the source and drain electrodes 30, for example, electrode of row N-type field-effect transistor 29. The other of the source and drain electrodes 31 is connected to the output terminal 5 of the image signal source. The gate electrode 32 is connected to the output terminal X1 of the row scan generator 2.

The field-effect transistors 21, 25, and 29 may be, for example, MOS transistors or thin-film transistors (TFT) of the insulated gate type. For the particular value of voltage illustrated in FIG. 2, the transistors are of the enhancement type. The characteristics of the MOS and TFT transistors are well known in the art and need not be described. Suffice it to say that such transistors are bidirectional in the sense that current can flow in either direction in the conduction path defined by the source and drain electrodes.

The light cell circuit arrangement operates in the following manner. During the non-selected time of the light cell, the terminal X1 and row conductor Y11 are at relatively low voltages, whereby the transistors 25 and 29 are biased in the off condition. The image signal waveform, illustrated at 35, is therefore disconnected from the light cell. As previously described, when the top row of the array is selected by the row scan generator, a row digital control pulse illustrated by the waveform 33 is developed at the generator output X1. At this time the digital waveform 33 goes sufficiently positive to bias the field-effect transistor 29 in an on condition, whereby the image signal is substantially coupled to the row conductor X11.

During the presence of the digital row pulse 33, the column scan generator 1 develops on the column conductor Y11 a digital column pulse, illustrated by the waveform 34. The column pulse 34 goes sufficiently positive at this time to bias the field-effect transistor 25 in the on condition. With both transistors 25 and 29 being biased in the on condition, the image signal is coupled by way of their relatively low impedance conduction paths to the gate electrode 24 of the output field-effect transistor 21. The input capacitance C of the output transistor 21 (illustrated by the dashed lines) of the output field-effect transistor, becomes charged to a value substantially equal to the amplitude of the image signal. Current proportional to the charge on the capacitance C flows in the conventional sense from the positive terminal of the energizing source 4 through the diode 20 and the conduction path of the field-effect transistor 21 to circuit ground.

When the digital column control pulse 34 terminates transistor 25 becomes biased in the off condition, whereby the image signal is decoupled from the gate electrode of the output field-effect transistor 21. However, the input capacitance C remains charged to substantially the amplitude of the image signal during the selection period. The signal information remains stored on the input capacitance C for a time determined by the impedance of the conduction paths of the cut off transistors 25 and 29 and by the value of the input capacitance C. This storage time being on the order of one second for present day MOS units is adequate, for example, in a video system wherein according to present standards, a scanning period is 1/30 second.

During the non-selected time, current proportional to the charge on the input capacitance C continues to flow through the light emissive diode 20 so that the emitted intensity remains substantially constant during the non-selected time. When the cell is again selected, the input capacitance C becomes charged to the amplitude of the image signal at this time.

In panels employing a large number of light cells (on the order to 10 or more) in a row, the selected row conductor may become overloaded due to the cumulative input capacitance of the parallel connected light cells so that the image signal becomes A.C. shorted to ground. In FIG. 2, for example, this condition can be seen by visualizing a large capacitance (not shown) connected between the drain electrode 30 of transistor 29 and circuit ground. This condition for large panels can be avoided by providing each light cell with its own row transistor 29 and applying the row digital waveform 33 to the gate electrodes of these separate row transistors. Also a group of row transistors 29 (not shown) could be provided for each row in the array with the number of row transistors for each row being less than the number of light cells in the row. For this latter arrangement, each row transistor thus provided would be common to only a portion of the light cells in a row.

Although the light cell array has been illustrated with N-type field-effect transistors, it is apparent that P-type transistors may be used provided that the polarities of the light emissive diode 20, the voltage source 4, and the column and row pulses are reversed. It is further apparent that the light emissive cells need not be arranged in a coordinate array of rows and columns. For instance, the array could be comprised of a single row or column of periodically scanned light cells in which case only one gating transistor corresponding to one of the row and column transistor would be required.

Accordingly, the invention has been presented as a novel selection and holding circuit arrangement for a plurality of light emissive elements.

What is claimed is:

1. A circuit arrangement in combination with a plurality of light emissive devices and a source of information signal, said circuit arrangeemnt comprising
   first and second like pluralities of insulated gate field-effect transistor means, each having a conduction path and a gate electrode for controlling the conduction thereof,
   first means for connecting the conduction paths of said first transistor means in series with different ones of said light emissive devices,
   second means for connecting the conduction paths of said second transistor means between different ones of the gate electrodes of said first transistor means and said information signal source, and
   control signal means for selectively applying control signals to the gate electrodes of said second transistor means.

2. The invention as claimed in claim 1
   wherein said light emissive devices are arranged in rows and columns to form a display,
   wherein said second means includes further insulated gate field-effect transistor means for each row, said further transistor means having conduction paths and gate electrodes for controlling the conduction thereof, said second means connecting the conduction paths of the second transistor means associated with each row in series with the conduction paths of the corresponding further transistor means and for connecting the series connected conduction paths between the gate electrode of the corresponding first transistor means and said signal source, and wherein said control signal means includes column conductors being connected to the gate electrodes of the second transistor means associated with the respective columns, whereby column control signals are selectively applied to said column conductors, said control signal means further including means for selectively applying row control signals to the gate electrodes of said further row transistor means.

3. The invention as claimed in claim 2 wherein said control signal means includes column and row scan generators for sequentially developing said column and row control signals.

References Cited

UNITED STATES PATENTS 3,246,162 4/1966 Chin -------------- 250—211

JOHN W. HUCKERT, *Primary Examiner.*

R. F. SANDLER, *Assistant Examiner.*

UNITED STATES PATENT OFFICE

CERTIFICATE OF CORRECTION

Patent No. 3,388,292 June 11, 1968

Joseph R. Burns

It is certified that error appears in the above identified patent and that said Letters Patent are hereby corrected as shown below:

Column 3, line 14, after "source" insert -- 4 --; line 14, after "DC" insert -- voltage --. Column 4, line 16, after "emitted" insert -- light --; line 22, "to" should read -- of --; line 56, "arrangeemnt" should read -- arrangement --. Column 5, line 11, after "conductors" insert -- , each column conductor --.

Signed and sealed this 18th day of November 1969.

(SEAL)
Attest:

Edward M. Fletcher, Jr.
Attesting Officer

WILLIAM E. SCHUYLER, JR.
Commissioner of Patents